United States Patent
Wolff

(10) Patent No.: US 8,036,433 B1
(45) Date of Patent: Oct. 11, 2011

(54) GRID-BASED DATA INPUT AND AUTHENTICATION

(75) Inventor: Gregory J. Wolff, Redwood City, CA (US)

(73) Assignee: Ricoh Co., Ltd., Tokyo (JP)

( * ) Notice: Subject to any disclaimer, the term of this patent is extended or adjusted under 35 U.S.C. 154(b) by 1598 days.

(21) Appl. No.: 10/817,242

(22) Filed: Apr. 1, 2004

(51) Int. Cl.
*G06K 9/00* (2006.01)

(52) U.S. Cl. ........................................................ 382/119

(58) Field of Classification Search .................. None
See application file for complete search history.

(56) References Cited

U.S. PATENT DOCUMENTS

| | | | | |
|---|---|---|---|---|
| 5,027,414 A | * | 6/1991 | Hilton | 382/122 |
| 5,194,852 A | * | 3/1993 | More et al. | 345/182 |
| 5,226,091 A | * | 7/1993 | Howell et al. | 382/119 |
| 5,517,578 A | | 5/1996 | Altman et al. | |
| 5,613,019 A | | 3/1997 | Altman et al. | |
| 6,687,390 B2 | * | 2/2004 | Avni et al. | 382/119 |
| 2002/0145592 A1 | | 10/2002 | Schauer | |
| 2004/0263487 A1 | * | 12/2004 | Mayoraz et al. | 345/173 |

* cited by examiner

*Primary Examiner* — Daniel Mariam
*Assistant Examiner* — Elisa Rice
(74) *Attorney, Agent, or Firm* — Patent Law Works LLP

(57) ABSTRACT

A system and method for authenticating user-input signatures or other data. A user draws a pattern on an input pad, using for example a pen, stylus, or finger. A grid, including a set of edges, is displayed on the input pad to help the user in drawing in the correct position on the pad. An input processor detects the edges crossed by the user in drawing the pattern. The sequence of edge crossings are converted into a symbolic sequence that can be output, authenticated, compared with previously stored symbolic sequences, or otherwise processed. Additional information, such as edge crossing timing, pen path, and the like, are optionally made available for further authentication.

98 Claims, 10 Drawing Sheets

GRID-BASED DATA INPUT AND AUTHENTICATION

FIELD OF THE INVENTION

The present invention relates generally to data input and authentication, and more particularly to grid-based techniques for inputting, recognizing, and authenticating pen-based input such as signatures.

BACKGROUND OF THE INVENTION

Written signatures are commonly used in many different contexts to indicate and authenticate an individual's identity and/or affirmation of a document, legal instrument, or the like. Written signatures are, in general, unique to individuals and can usually be verified to establish their authenticity. In addition, written signatures have additional properties that contribute to their usefulness: people do not usually forget their signature (as they might forget an arbitrary password); signatures cannot be stolen as easily as passwords; and signatures require no special technology to use and authenticate (generally, all that is needed is a pen and paper). Furthermore, signatures have been in use for a very long time and thus have accumulated a cachet of importance and legitimacy.

One deficiency of written signatures is that it is difficult for machines, such as computers, to verify or authenticate them. Machines are more proficient at verifying individuals by checking a user-entered password or digital identifier. However, such authentication methods have significant drawbacks: for example, passwords or digital identifiers can often be easily stolen, forgotten, or even guessed. It is usually not possible to determine whether password input was keyed in by an authorized person, or even whether it was keyed in by a person or automatically sent by a machine. Even smart cards with embedded security chips may be compromised or stolen, leaving the victims of such fraud with little or no recourse in trying to prove they did not authorize a transaction.

While it is possible to combine conventional digital identification systems with biometric systems, for example using a badge along with retinal scanning, these systems place significant burden on users. For example, users must always have their badge with them and not forget their PIN—which can especially be a problem if they must interact with a number of different systems and if PINs are changed regularly for security purposes.

What is needed is an authentication system and method that combines the benefits of both signature-based and password-based methodologies, and that avoids the limitations of both. What is further needed is an authentication system and method that facilitates automated (machine-based) authentication and verification of data such as signature input. What is further needed is an authentication system and method that avoids the limitations of prior art techniques.

SUMMARY OF THE INVENTION

The present invention combines the advantages of signature-based authentication with those of password-based authentication. A user draws a pattern on an input pad, using for example a pen, stylus, or finger. The pattern can be the user's signature, or initials, or any arbitrary shape(s) or character(s) or other data. A grid, including a set of edges, is displayed on the input pad to help the user in drawing in the correct position on the pad.

According to the techniques of the present invention, an input processor detects the edges crossed by the user in drawing the pattern. The sequence of edge crossings are converted into a symbolic sequence that can be output, authenticated, compared with previously stored symbolic sequences, or otherwise processed.

In addition to the sequence of edge crossings, other characteristics of the user's input can be detected and analyzed for authentication purposes. Such characteristics include, for example: the direction of each edge crossing; the timing of the edge crossings (by measuring, for example, the time interval between one edge crossing and the next); and the actual path traced by the user in inputting the pattern. Depending on the degree of authentication needed for a particular application, different types of characteristics (or combinations of characteristics) can be analyzed, and different levels of stringency of such analysis can be applied. For example, the sequence of edge crossings and the directions of edge crossings can be used as replacements for password authentication, while the timing information and/or input path can be used for authentication/verification analysis as a replacement for conventional handwriting or signature analysis. Statistical analysis can be used for any or all of these comparisons.

By providing a grid-based signature authentication system and method, the present invention offers many advantages of both signature-based and password-based systems. It reduces the burden on individuals to remember various identifier/password combinations. It facilitates capturing and storing a verifiable audit trail for digital transaction authorizations. It allows individuals to use a single signature for all electronic and paper transactions. Finally, the techniques of the present invention can reduce or eliminate the need for trusted third parties to perform authentication.

BRIEF DESCRIPTION OF THE DRAWINGS

The accompanying drawings illustrate several embodiments of the invention and, together with the description, serve to explain the principles of the invention.

DETAILED DESCRIPTION OF THE EMBODIMENTS

The present invention is now described more fully with reference to the accompanying Figures, in which several embodiments of the invention are shown. The present invention may be embodied in many different forms and should not be construed as limited to the embodiments set forth herein. Rather these embodiments are provided so that this disclosure will be complete and will fully convey the invention to those skilled in the art.

In particular, while the following description sets forth the invention in terms of signature authentication, one skilled in the art will recognize that the techniques of the present invention can be used for receiving and authenticating other types of data as well.

Figure 1:
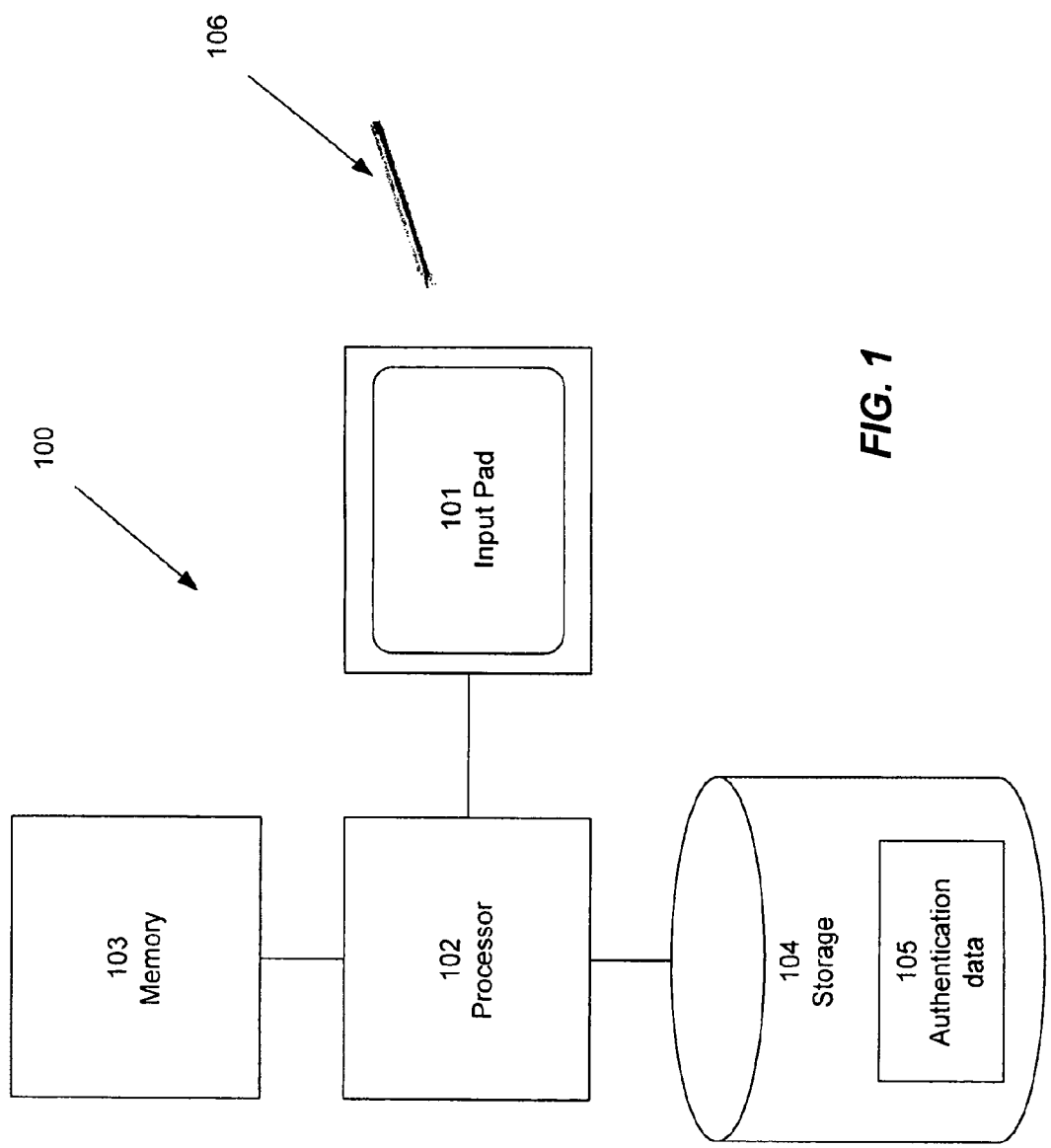
FIG. 1 is a block diagram depicting a grid-based data authentication system according to one embodiment of the present invention.

Referring now to FIG. 1, there is shown a grid-based data authentication system 100 according to one embodiment of the present invention. System 100 can be implemented, for example, in a conventional personal computer, personal digital assistant (PDA), handheld device, or cell phone. System 100 can also be implemented as a component of an office productivity device (such as a photocopier), or as part of an access system (such as an entry system to control access to a door, elevator, or the like).

In one embodiment, as shown, system 100 includes a processor 102, memory 103 (such as random-access memory), and an input device such as input pad 101. One skilled in the art will recognize that the present invention can be used with other input devices, such as a mouse, trackball, or other pointing device (not shown) that can be used for drawing a pattern. For example, in one embodiment, the invention is implemented using a pen including a camera or other sensing device for tracking edge crossings and pen path. Once such data is captured, it is processed in the same manner as described below.

Additionally, system 100 may include a separate output device such as a display screen (not shown), in addition to or instead of input pad 101; alternatively, input pad 101 can be capable of functioning as a display screen as well as being an input device.

Processor 102 can be any general-purpose microprocessor capable of executing software instructions. Memory 103 can be any conventional and widely available type, for use as a workspace while performing software instructions to perform the steps of the present invention. Storage 104 may be any type of local or remote storage where data 105 used for authentication can be stored. In one embodiment, system 100 accesses storage 104 via a network connection; in another embodiment, storage 104 is local and system 100 accesses it using a conventional communication bus. Alternatively, system 100 can omit storage 104 and can instead communicate with a local or remote resource (for example, via a network) to obtain authentication data. Alternatively, in embodiments where comparison with stored data is not performed, storage 104 can be omitted entirely.

Figure 2:
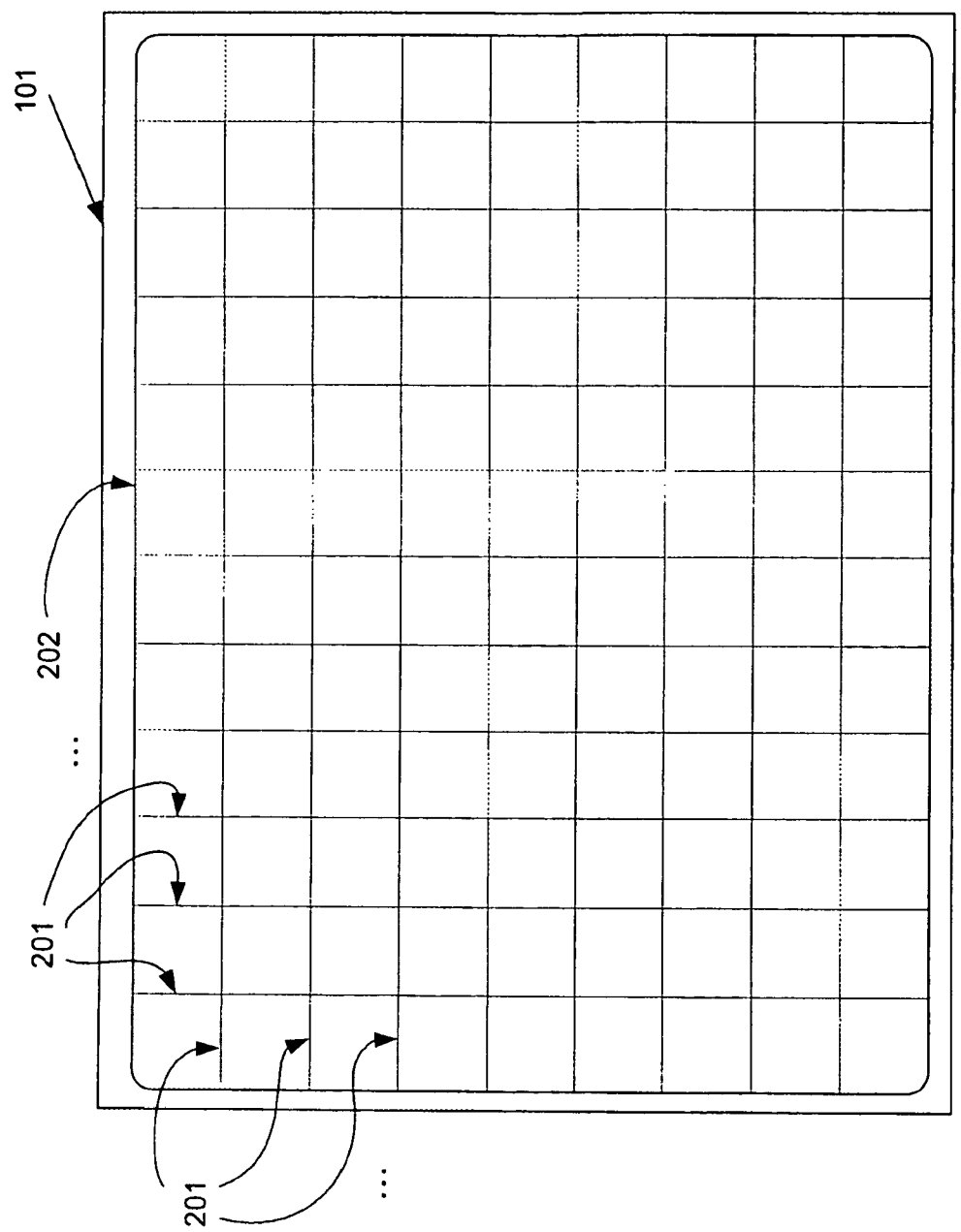
FIG. 2 depicts an input pad with grid edges according to one embodiment.

Referring now to FIG. 2, there is shown an example of input pad 101 according to one embodiment. Input pad 101 is a commonly available digitizing pad having a fairly fine sampling resolution, such as for example 300 dots per inch (dpi) and 1000 samples/second. Input pad 101 is capable of detecting input provided via pen 106, or via a stylus, finger, or any combination thereof (not shown). In one embodiment, input pad 101 is also an output device that can display the user's input so as to provide immediate visual feedback, and can also display other useful output and user interface elements.

An example of such a digitizing pad is the Intuos 2 tablet input system, available from Wacom Technology Co. of Vancouver, Wash.

In one embodiment, grid 202, including a series of edges 201, is superimposed over the surface of input pad 101, either as a printed overlay or as a displayed element. Grid 202 helps the user provide his or her input in a consistent manner, so as to improve performance of the authentication system. Also, as will be seen below, grid 202 provides the basis for converting edge crossings into symbolic representations. In one embodiment, grid 202 is a pattern of squares at, for example, ten lines per inch, and is gray in color. In other embodiments, grid 202 can be formed from triangles, rectangles, hexagons, or any other shape. Alternatively, grid 202 can be omitted entirely, or replaced by any arbitrary series of edges 201 that are used by the system 100 as a basis for converting edge crossings into symbolic representations. In some embodiments, rather than providing grid 202, input pad 101 may include a series of edges wherein each edge occupies some portion (such as 80%, for example) of the boundary between two cells.

In one embodiment, as user moves pen 106 or other input device over the surface of input pad 101, visual feedback is provided, for example by turning on those pixels at locations that have been traversed by pen 106. This appears as a trail of "ink" so that the user can see the pattern formed by his or her input. In addition, in one embodiment, whenever pen 106 crosses a grid edge 201, that edge is highlighted (either persistently or momentarily), to provide additional feedback to the user. In embodiments where grid 202 is not generally displayed, such highlighting is accomplished by displaying edges 201 as they are crossed. In embodiments where grid 202 is generally displayed as a guide for the user, such highlighting is accomplished, for example, by displaying crossed edges 201 in a different color, or by displaying them more brightly, or by using some other distinctive visual characteristic to indicate crossed edges 201. In an embodiment where edges occupy only a portion of the boundary between two cells, a user can cause an input stroke to travel from cell to cell without crossing an edge; thus the user could cross edges 201 in any desired sequence without lifting pen 106 or other input device from the surface of input pad 101.

In one embodiment, a signature or other data is initiated by a pen-down event and completed explicitly (by detecting that the user has pushed a button indicating that the signature has been completed) or implicitly (after a timeout period without a pen-down event, or upon detection of a pen-up event.) Implicit completion detection based on a pen-up event can be particularly useful in embodiments where, as described above, a user can cross edges 201 in any desired sequence without lifting pen 106 or other input device from the surface of input pad 101; in such embodiments, a pen-up event can be definitively interpreted as an indication that input is complete.

Processor 102 detects the user's input and provides appropriate visual feedback, by displaying for example an "ink" trail showing the pen path and by highlighting crossed edges 201.

Figure 3:
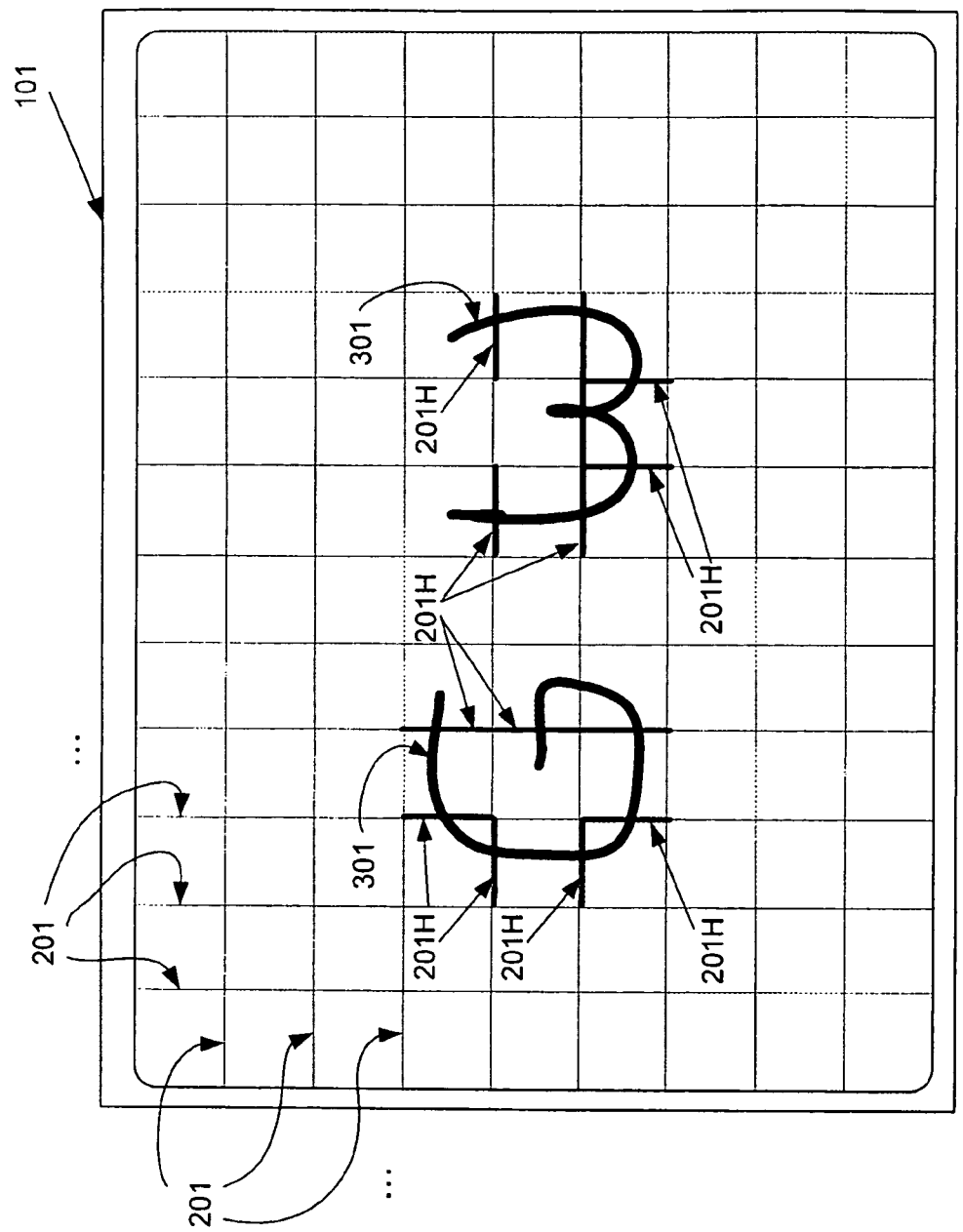
FIG. 3 depicts an input pad including a user-entered pattern, according to one embodiment.

Referring now to FIG. 3, there is shown an example of input pad 101 including a user-entered pattern 301 (such as a signature pattern), according to one embodiment. In the example shown, the user has entered his initials, "GW" as the input pattern 301. Edges 201H crossed by pen 106 are highlighted, as shown in the figure as bold lines.

Examples of types of information that can be captured from the user-entered pattern 301 include: the set of edge crossings 201H, the directions of edge crossings 201H, time intervals between edge crossings 201H, and the path traced by pen 106 in drawing pattern 301. The path can be captured, for example, in terms of a sequence of point coordinates, and in one embodiment also includes timestamps associated with each point coordinate in the sequence.

Figure 4:
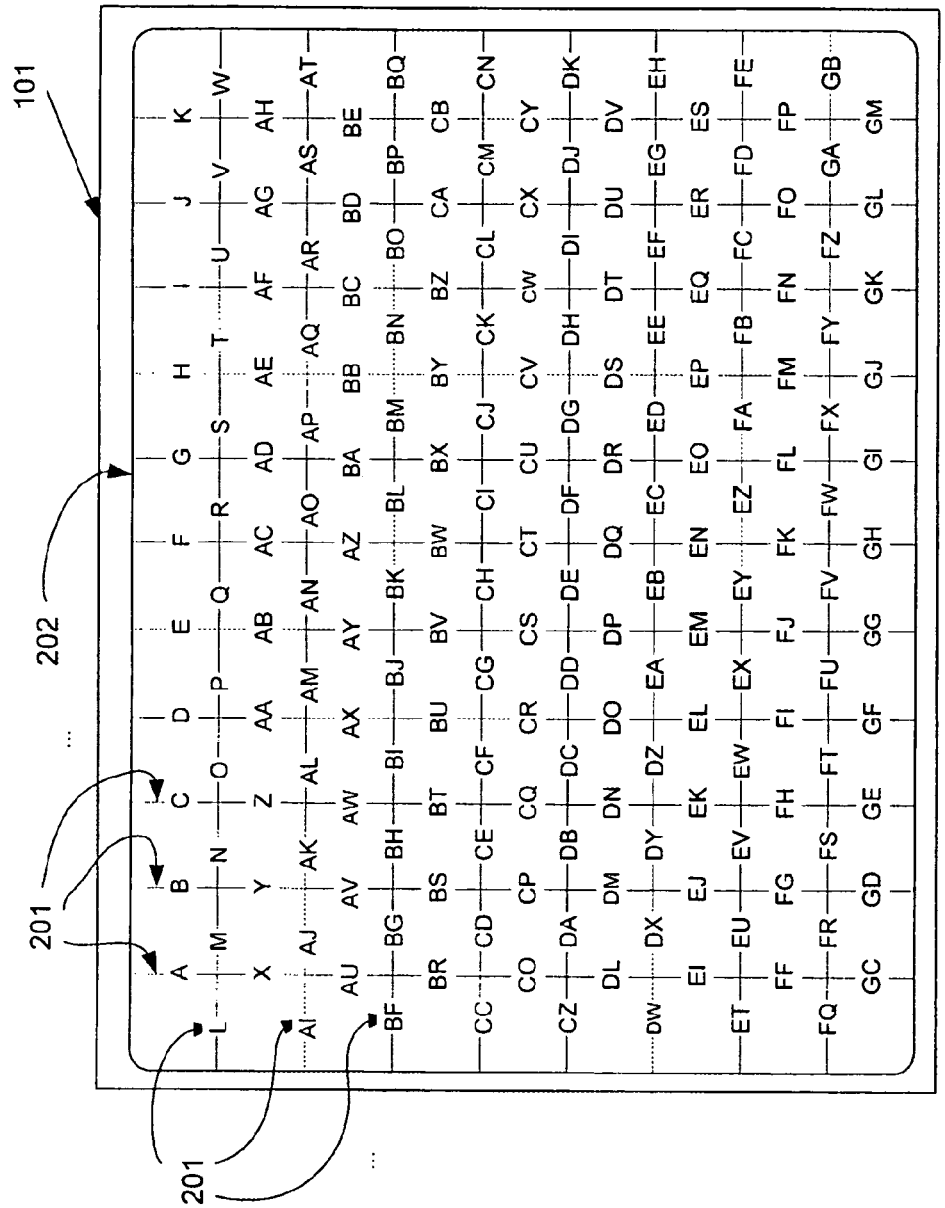
FIG. 4 depicts an input pad with grid edges, wherein labels have been assigned to grid edges, according to one embodiment.

One skilled in the art will recognize that, according to the techniques of the present invention, any of these types of information, or any combination thereof, can be captured and used. For example, in one embodiment the set of edge crossings 201H provides the primary information used to identify and/or authenticate the user. The sequence may be represented as a string of characters. An alphanumeric character (or string) is assigned to each edge 201H in grid 202, for example in alphabetical sequence as shown in FIG. 4.

Figure 5:
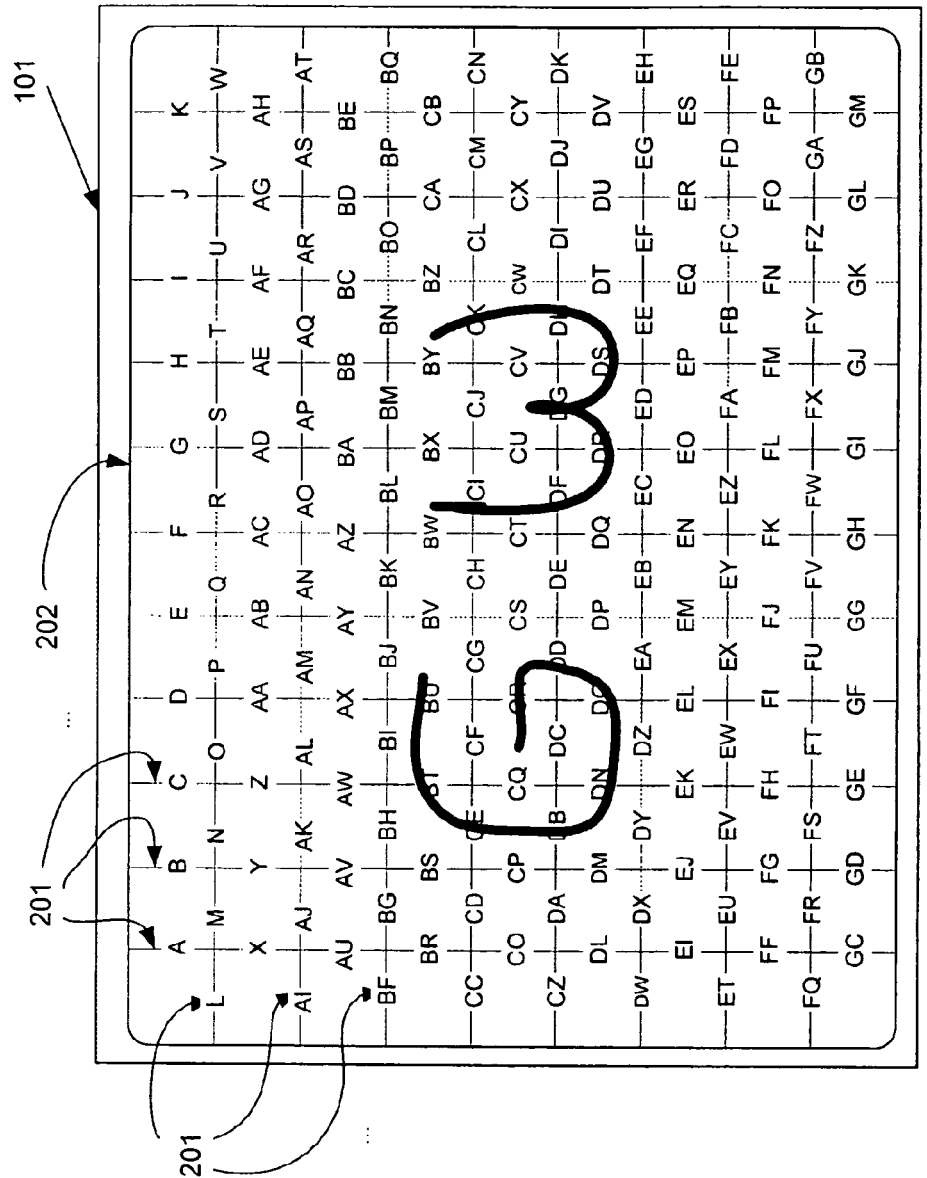
FIG. 5 depicts an input pad wherein labels have been assigned to grid edges, and including a user-entered pattern, according to one embodiment.

A string can then be formed by taking, in sequence, the characters (or strings) corresponding to the crossed edges 201H. For example, as shown in FIG. 5, the user-entered pattern 301 corresponds to the following character string:

BU,BT,CE,DB,DN,DO,DD,CR,CI,DF,DR,DG,DG,DS, DH,CK

In one embodiment, the character string can be split between CR and CI by recognizing that the pen was lifted between these two edge crossings. The system can detect that the pen was lifted by observing that edges CR and CI do not abut the same cell in grid 202.

In one embodiment, a relative mapping system is used, wherein the leftmost, topmost crossed edges are used as the origin (rather than applying absolute labeling of edges). Relative mapping avoids confusion on the user's part that may arise from accidentally translating a the data by one grid cell, for example.

In one embodiment, the mapping between edges 201 and characters is limited to a rectangular range of cells (for example 3 rows by 7 columns) and is then repeated (tiled) to fill the remainder of input pad 101.

Edge crossings can be detected using any of a number of different techniques. In one embodiment, the following methodology is used:

Define each edge as a set of points E;
Define the set of points adjacent to E that are above or left of E to be E+;
Define all other points adjacent to E to be E−;
Given a sequence of pen movement events $s_1, s_2, \ldots, s_n$:
  If $s_1$ is a member of E+, and $s_2, \ldots, s_{n-1}$ are members of E, and $s_n$ is a member of E−, then add edge E to the sequence of edges crossed (in the positive direction).
  If $s_1$ is a member of E−, and $s_2, \ldots, s_{n-1}$ are members of E, and $s_n$ is a member of E+, then add edge E to the sequence of edges crossed (in the negative direction).

In one embodiment, other types of information are also captured and used. For example, the direction of each edge crossing can be detected and captured. The character string containing edge crossing information can be augmented with symbols such as + or −, where + indicates a left-to-right or top-to-bottom crossing, and − indicates a right-to-left or bottom-to-top crossing. The following is an example of such a character string corresponding to FIG. 5:

−BU,−BT,+CE,+DB,+DN,+DO,−DD,−CR,+CI,+DF,+DR,−DG,+DG,+DS,−DH,−CK

One skilled in the art will recognize that many other methodologies for mapping edges to characters can be used. For example, in one embodiment a user-modifiable lookup table (LUT) (not shown) is employed. This LUT specifies an ASCII sequence corresponding to each possible sequence of edges. For example, edges 201 may be numbered consecutively (1, 2, 3, 4, ..., N) and the lookup table may be initialized so that each single edge sequence corresponds to a single letter, as follows:

| Edge sequence | ASCII |
| --- | --- |
| 1 | A |
| 2 | B |
| 3 | C |
| 4 | D |
| ... | ... |

Figure 9:
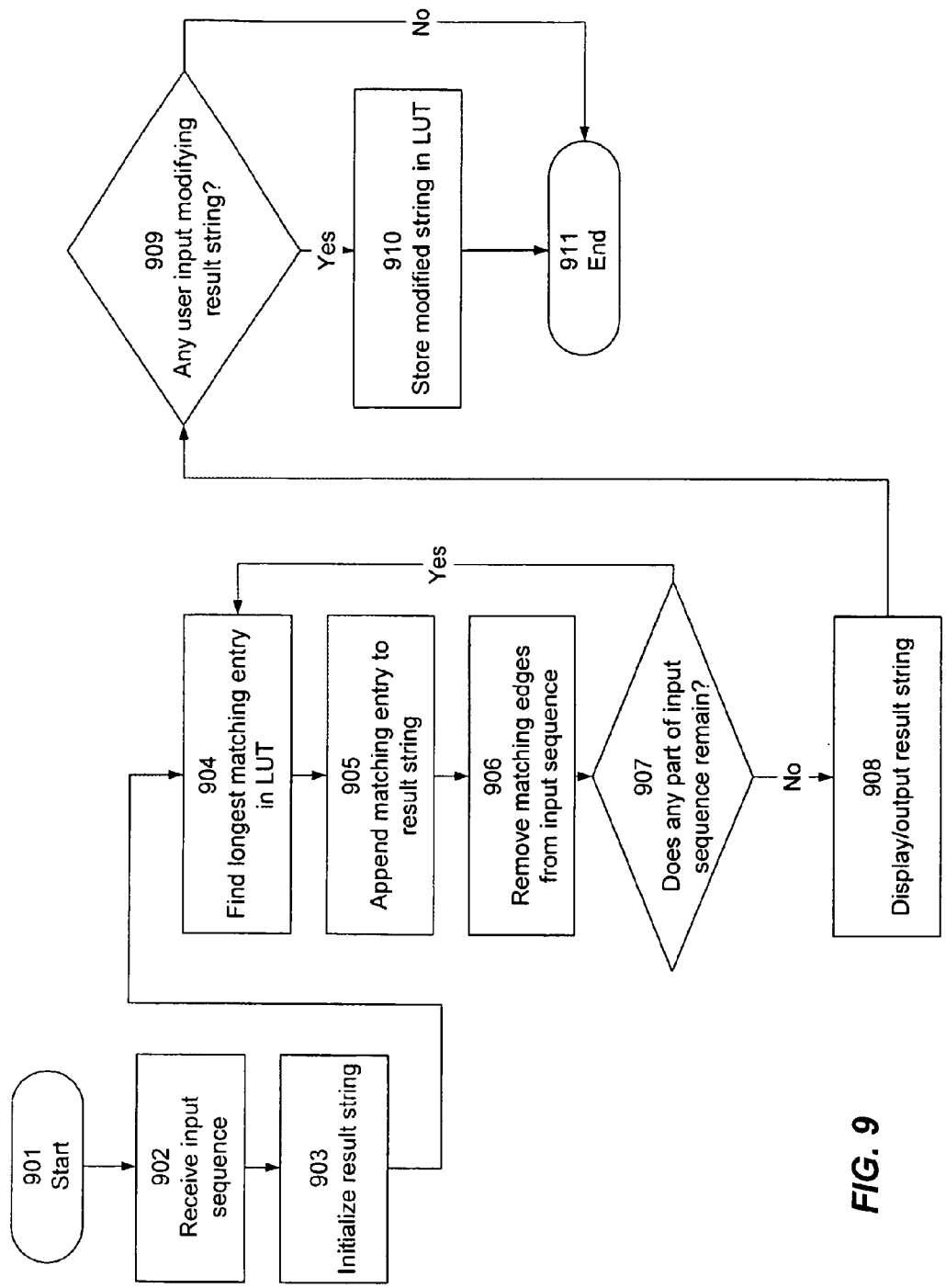
FIG. 9 is a flowchart depicting a lookup algorithm for an input sequence.

Referring now to FIG. 9, there is shown a flowchart depicting a lookup method for an input sequence. The input sequence is received 902 and a result string is initialized 903 to be empty. Then, the longest matching entry in the LUT is found 904 and appended 905 to the result string. A match is indicated when there is an exact match between an entire edge sequence of length m in the LUT and the first m edges in the input, where m is as large as possible.

The first m edges from the input sequence are removed 906. If any part of the input sequence remains 907, steps 904 to 907 are repeated. The result string is then displayed 908 to the user.

Once the string has been displayed, the user may be given an opportunity to modify the string to be an arbitrary ASCII sequence. In one embodiment, this is done by allowing the user to type or provide some other form of input with the desired string. If the user does modify the result string 909, the modified string is stored 910 in the LUT. In addition, in one embodiment, analog data associated with the input pattern is stored as a prototype pattern and is associated with the modified string. Thus, the user's modifications to the result string 909 are used to train system 100 for improved accuracy when receiving and interpreting future input.

For example, if the edge sequence were (3,1,4), the string "CAD" would be displayed. If the user replaced "CAD" with "CARE", the above LUT would be updated as follows:

| Edge sequence | ASCII |
| --- | --- |
| 1 | A |
| 2 | B |
| 3 | C |
| 4 | D |
| 3,1,4 | CARE |
| ... | ... |

Thus, if in the future the user crosses edges 3,1,4, the output is "CARE" (a full match with one of the LUT entries). If the user crosses edges 3,1,2, the output is "CAB" (only single edge matches). If the user crosses edges 3,1,4,4, the output is "'CARED'" (3,1,4 matches CARE, 4 matches D).

LUTs can be easily shared and transferred from one person/system to another, and easily combined by taking the union of edge sequences and specifying which original takes precedence in the case of clashes. Thus, in one embodiment the present invention provides a mechanism for allowing users to easily expand their "stroke" vocabulary, effectively creating their own shorthand.

Another type of information that is captured and used in one embodiment is interval timing. For example, processor 102 can detect the time, in milliseconds, between the completion of one edge crossing and the beginning of the next edge crossing. In one embodiment, the system employs a predetermined degree of hysteresis: pen 106 must travel some threshold distance beyond an edge 201 before the edge 201 is considered to have been crossed. The interval timing is used, in one embodiment, to provide further indicators of authenticity for the input. A tolerance value is established, and a signature or other data that does not match (within the specified tolerance) the reference interval timings stored in authentication data 105 is considered invalid, even if the sequence of edge crossings and the directions match.

Another type of information that is captured and used in one embodiment is the actual path followed by pen 106 when the data is input. This actual path is captured using conventional techniques for detecting movement of pen 106 or other input device on input pad 101. In one embodiment, pressure information is also captured and stored. The path of the input data can be compared with reference data stored in authentication data 105, using for example conventional handwriting analysis methods, to provide further indication as to whether a signature (or other data) is authentic.

In one embodiment, time intervals and/or path information are compared and authenticated using probabilistic methods, so as to allow for some degree of deviation from a reference. For example, in one embodiment, processor 102 compares each time interval against a set of previously captured time intervals from previously input data from the same individual. A threshold is determined for each time interval based on the mean and standard deviation of the previously input data. If more than N intervals do not match (where N is some predefined number, or is specified by an administrator), the data is rejected or flagged for further analysis. One skilled in the art will recognize that many other types of probabilistic analysis, well known in the art, may be used. Other refinements, include, for example, estimate a global speed parameter for each particular signature (or other data) and then comparing time intervals after normalizing for this overall speed. In addition, forensic analysis can be applied to authenticate data based on time intervals and/or pen path, according to conventional handwriting analysis techniques.

Figure 10:
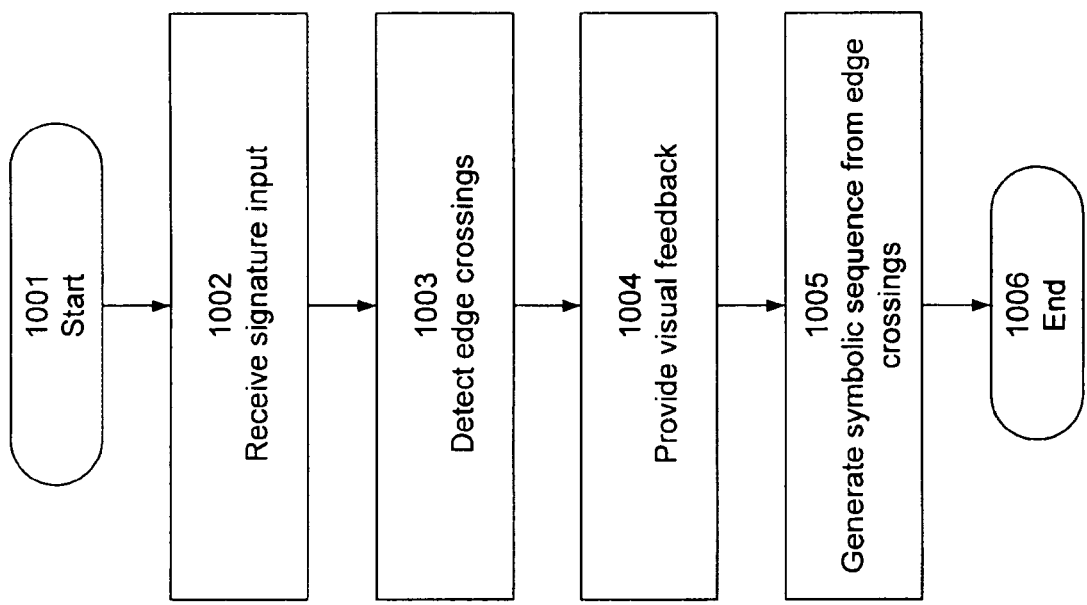
FIG. 10 is a flowchart depicting an overall method of practicing the present invention according to one embodiment.

Referring now to FIG. 10, there is shown an overall method of practicing the present invention according to one embodiment. Input pad 101 received 1002 user input representing a signature or other data. As input is received, processor 102 detects 1003 edge crossings. Input pad 101 (or some other device) provides the user with visual feedback 1004 such as an indication of the pen path, highlighted edge crossings, or the like. Processor 102 generates 1005 a symbolic sequence using the set of edge crossings. The symbolic sequence can be stored, analyzing, authenticated, or the like, according to the various techniques described herein.

One skilled in the art will recognize that many different arrangements of storing, comparing, and authenticating input can be performed. In one embodiment, input pad 101 and processor 102 gather information describing an input signature or other data, including any or all of the above-discussed types of information, and transmit the gathered information to an authenticating server (not shown) for storage, analysis, and/or authentication. In another embodiment, processor 102 performs time interval comparisons locally with respect to stored authentication data 105, and transmits to an authenticating server (not shown) the edge crossing sequence. In addition, a representation of the data, in terms of its path or other data, can be stored in storage 104. In another embodiment, upon user entry of input data, system 100 stores an encrypted, timestamped version of the data (the pen path). System 100 sends the sequence of edge crossings and interval timings to an authenticating server, along with some type of "fingerprint" representing the encrypted complete data, such as for example a one-way hash computed using known algorithms such as MD5 or SHA1. At a later time, a trusted third party may request the pen path information for forensic analysis. This independent check serves either or both parties in determining or proving fraud.

Input can take any form, depending on the wishes of the user and on what kinds of input he or she finds easiest or most reliable. For signatures, for example, users may choose to use their initials or actual handwritten signature, so as to make it easier to remember and reliably duplicate the input. In general, it is expected that most users will choose to provide input that has some sort of meaning for them, although this is not required. It has been found that muscle memory plays a role both in easily creating patterns and having timing information that can be reliably authenticated and verified.

Once a user has created and learned a signature for the system of the present invention, they tend to remember the signature more effectively than they do an arbitrary password.

In one embodiment, the present invention facilitates the use of the same signature for multiple systems, since compromise of one system would not entail compromising the user's information or access to other, higher-security systems. The use of difficult-to-forge timing and related information allows such multiple usages of the same signature while reducing the risk of unauthorized use. Thus, the user need not remember a large number of different user identifiers and passwords for a variety of systems.

One skilled in the art will recognize that any or all of the above types of information, alone or in any combination, can be used in authenticating an input signature or other data. In addition, in one embodiment, different combinations of the above may be made available depending on the particular level of security appropriate to a given situation. For example, logging into a webbased email system may be considered low risk, and an administrator may specify that only the edge crossings need be compared and authenticated, without regard to timing or other information. On the other hand, for a financial transaction (such as authorization for payment), the administrator might specify that additional authentication be performed, by for example comparing edge crossing directions and time intervals, as well as the sequence of edge crossings themselves.

Accordingly, an attempt at gaining unauthorized access by forging a user's input would likely fail, particularly if additional authentication is required. Even if the individual attempting unauthorized access successfully duplicated the set of edge crossings, he or she would likely fail to match the interval timing and/or pen path, and thereby would fail the authentication. Unlike pure digital systems that provide "all-or-nothing" security, the system and method of the present invention allows data authentication to be scaled appropriately for the type of threats and potential losses. It also supports further analysis and evidence in the case of compromises.

In the above description, for illustrative purposes, the invention has been described in terms of signatures on an input pad 101 such as a specialized hardware device or a conventional digitizing tablet/display. One skilled in the art will recognize that the invention can also be implemented in other types of systems. For example, in an alternative embodiment, the invention can be implemented as a software application. A standard software application installed in a personal computer could display grid 202 on a standard display screen. A user can drag a pointing device (e.g. mouse) over a trajectory similar to using a pen on a digitizing tablet. Alternatively, a user can simply click on the grid crossings in the appropriate sequence.

In another embodiment, rather than signing on an input pad 101, the user can sign a piece of paper that is then scanned by a scanner. The piece of paper can include a grid 202, if desired, so that the user can more easily generate a consistent signature. If the grid 202 is omitted, edge crossings can be inferred. The signature is then analyzed in a manner similar to that described above (although timing information is not available, since the system 100 does not have an opportunity to capture such information as the user signs).

In another embodiment, a user can simply type in the symbolic representation sequence via a keyboard. If appropriate, timing information can be stored if deemed reliable and appropriate for a higher level of authentication. If desired, a grid map can be displayed, including edge labels, to help the user remember the symbolic representation sequence. Also, in one embodiment, the grid mapping may be designed to correspond to a keyboard layout.

Figure 6:
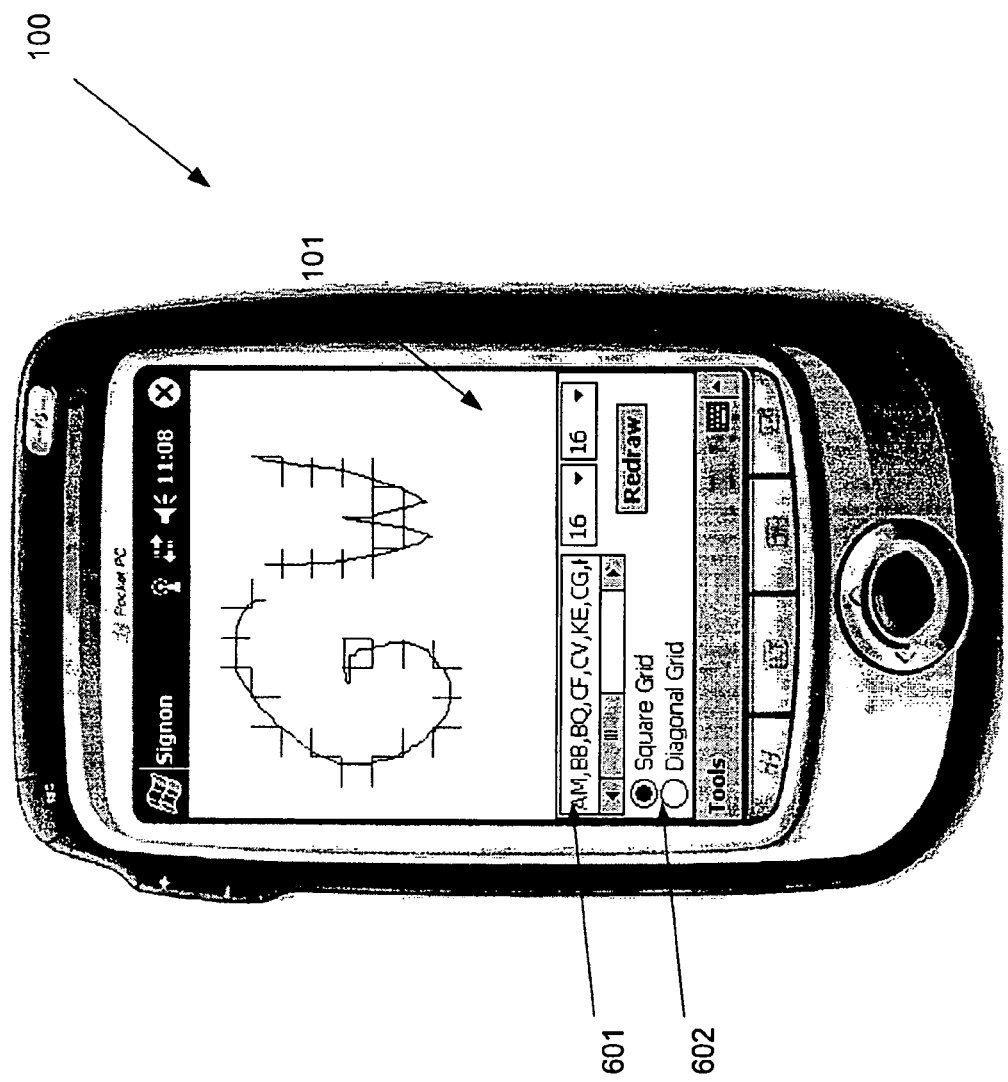
FIG. 6 is an example of a personal digital assistant for accepting input according to one embodiment.

Referring now to FIG. 6, there is shown an example of an implementation of the invention according to one embodiment. System 100 is implemented in a personal digital assistant (PDA) that includes an integrated input pad 101. Field 601 shows a string of characters corresponding to the user-entered signature; in one embodiment field 601 is updated as the user enters the data, so as to provide immediate visual feedback. Grid edges are highlighted as they are crossed. Also provided is a set of radio buttons 602 for selection between a square grid and a diagonal grid; one skilled in the art will recognize that other types of grid selections may also be provided, including for example the option to select a coarser or finer grid.

Figure 7:
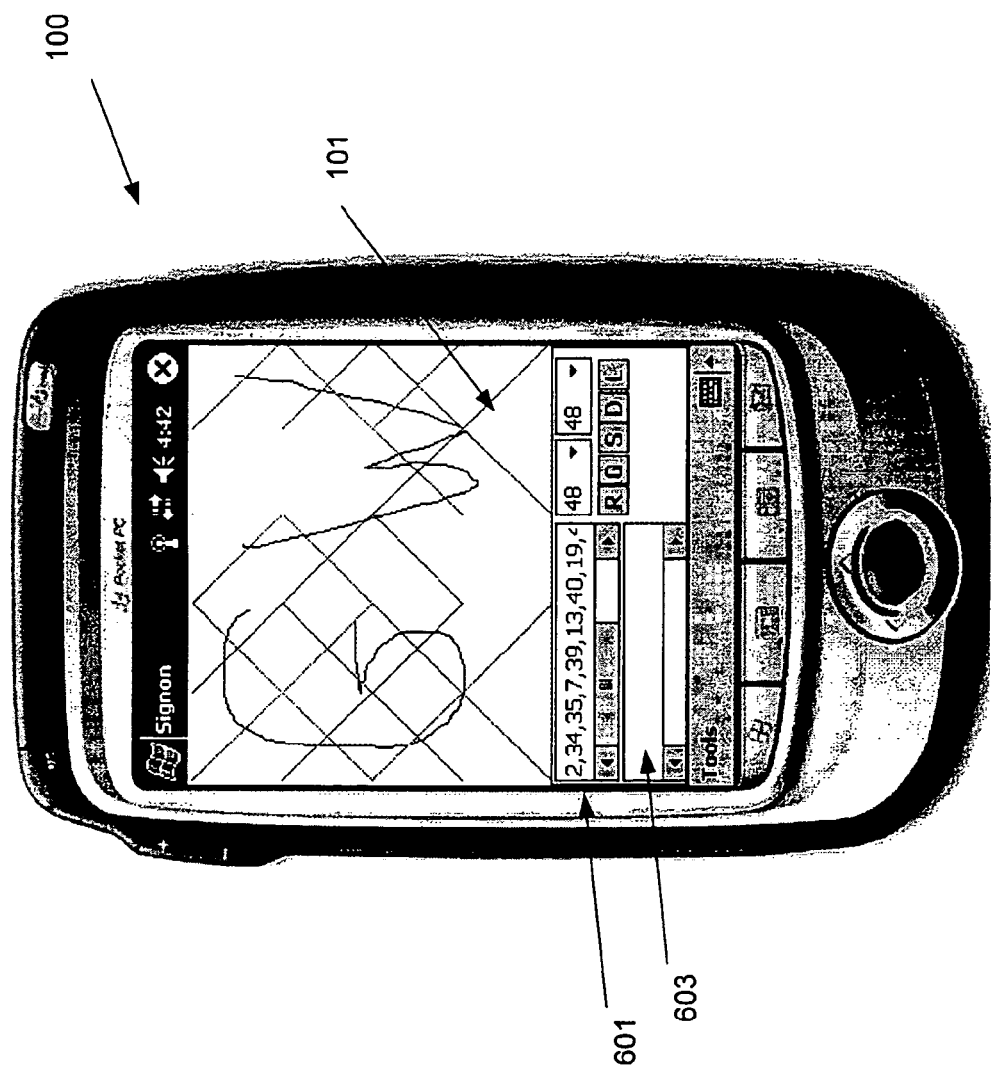
FIG. 7 is an example of input using a diagonal grid, according to one embodiment.

Referring now to FIG. 7, there is shown an example data input using a diagonal grid, according to one embodiment. Here, field 601 shows a series of numbers identifying edge crossings. One skilled in the art will recognize that the representation of edge crossings can take any desired form, and that edges can be identified according to any desired scheme. One skilled in the art will further recognize that any type of grid or edge pattern can be provided. In one embodiment, device 100 also displays the actual symbolic string (for example, "Gregory Wolff") in area 603. In embodiments, where the symbolic string can be associated with analog data describing the input, a Save button (not shown) may also be provided in area 603 to save the association in storage.

Figure 8:
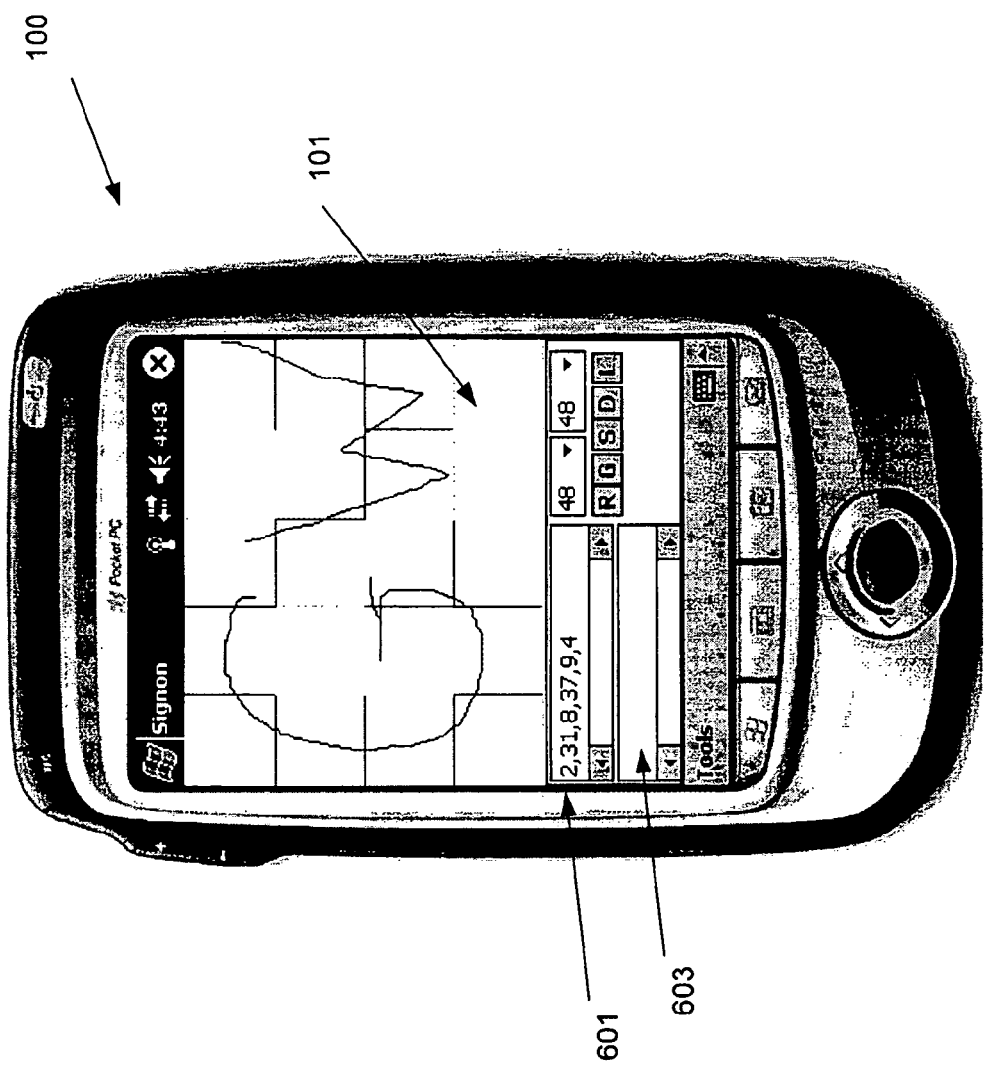
FIG. 8 is an example of input using a coarse grid, according to one embodiment.

Referring now to FIG. 8, there is shown an example data input using a coarse grid, according to one embodiment. In one embodiment, the user can select whether the grid is coarse or fine, and to what degree.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems may be used with programs in accordance with the teachings herein, or it may prove convenient to construct more specialized apparatuses to perform the method steps. The required structure for a variety of these systems will appear from the description below. In addition, the present invention is not described with reference to any particular programming language. It will be appreciated that a variety of programming languages may be used to implement the teachings of the invention as described herein. Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

What is claimed is:

1. A method for data entry and authentication, the method comprising:
   receiving, with an input device, user input representing a pattern drawn over one or more of a plurality of edges;
   detecting, with a processor, edge crossings within the pattern, one of the detected edge crossings specifying an identified point;
   mapping, with the processor the plurality of edges to a plurality of symbolic representations, each edge having a unique symbolic representation that includes at least one character, with a relative mapping using the identified point as an origin for the relative mapping; and
   generating, with the processor, a symbolic sequence from the detected edge crossings based on the mappings between the edges and the symbolic representations.

2. The method of claim 1, wherein the symbolic sequence comprises a representation of a series of detected edge crossings.

3. The method of claim 1, wherein the symbolic sequence comprises a representation of a series of detected edge crossings and of the direction of each edge crossing.

4. The method of claim 1, wherein the user input comprises a signature.

5. The method of claim 1, wherein the received user input comprises pen-based input.

6. The method of claim 1, further comprising displaying the plurality of edges.

7. The method of claim 1, wherein receiving user input comprises detecting pen-based input on an input pad.

8. The method of claim 1, further comprising providing user feedback by, responsive to the received user input, highlighting crossed edges.

9. The method of claim 1, wherein receiving user input comprises detecting input on a touch-sensitive pad.

10. The method of claim 1, further comprising outputting the generated symbolic sequence.

11. The method of claim 1, further comprising authenticating the generated symbolic sequence.

12. The method of claim 11, wherein authenticating the generated symbolic sequence comprises comparing the generated symbolic sequence with a previously stored symbolic sequence.

13. The method of claim 1, wherein the symbolic sequence comprises a string of alphanumeric characters.

14. The method of claim 13, further comprising:
   receiving user input modifying the string; and
   storing the modified user string.

15. The method of claim 14, further comprising:
   associating the modified user string with a representation of the pattern.

16. The method of claim 1, wherein the plurality of edges forms a grid.

17. The method of claim 16, wherein the mappings between the edges and the symbolic representations are based on the positions of the edges within the grid.

18. The method of claim 1, wherein the plurality of edges forms a grid of squares.

19. The method of claim 1, wherein the plurality of edges forms a grid of rectangles.

20. The method of claim 1, wherein the pattern comprises a series of lines.

21. The method of claim 1, wherein the pattern represents a user signature.

22. The method of claim 1, wherein the pattern represents at least one alphanumeric character.

23. The method of claim 1, further comprising detecting user input indicating completion of the pattern, wherein generating a symbolic sequence is performed responsive to detecting the user input indicating completion of the pattern.

24. The method of claim 23, wherein the user input indicating completion of the pattern comprises user activation of a button on a screen.

25. The method of claim 1, further comprising detecting no user input over a predetermined period of time, indicating completion of the pattern, wherein generating a symbolic sequence is performed responsive to detecting no user input over the predetermined period of time.

26. The method of claim 1, further comprising detecting deactivation of an input device, indicating completion of the pattern, wherein generating a symbolic sequence is performed responsive to detecting deactivation of the input device.

27. The method of claim 1, further comprising detecting lifting of a stylus, indicating completion of the pattern, wherein generating a symbolic sequence is performed responsive to detecting lifting of the stylus.

28. The method of claim 1, wherein receiving user input comprises receiving input from a pointing device, the method further comprising, responsive to the received user input, displaying the path of the pointing device.

29. The method of claim 1, further comprising, responsive to the received user input, displaying the pattern.

30. The method of claim 1, further comprising storing the generated symbolic sequence.

31. The method of claim 1, further comprising detecting directions for the edge crossings.

32. The method of claim 31, further comprising authenticating the user input by comparing the detected edge crossing directions with previously stored edge crossing directions.

33. The method of claim 31, further comprising authenticating the user input by comparing the generated symbolic representation with a previously stored symbolic representation and by comparing the detected edge crossing directions with previously stored edge crossing directions.

34. The method of claim 1, further comprising detecting time intervals between the edge crossings.

35. The method of claim 34, further comprising authenticating the user input by comparing the detected time intervals with previously stored time intervals.

36. The method of claim 34, further comprising authenticating the user input by comparing the generated symbolic representation with a previously stored symbolic representation and by comparing the detected time intervals with previously stored time intervals.

37. The method of claim 34, further comprising authenticating the user input by performing statistical comparison of the detected time intervals with previously stored time intervals.

38. The method of claim 1, wherein receiving user input comprises receiving user input via a pointing device, the method further comprising detecting a path of the pointing device.

39. The method of claim 38, further comprising authenticating the user input by comparing the detected path with a previously stored path.

40. The method of claim 38, further comprising authenticating the user input by comparing the generated symbolic representation with a previously stored symbolic representation and by comparing the detected path with a previously stored path.

13

41. The method of claim 38, further comprising authenticating the user input by performing statistical comparison of the detected path with a previously stored path.

42. The method of claim 1, wherein receiving user input comprises receiving user input via a pointing device, the method further comprising detecting at least two selected from the group consisting of:
   directions for the edge crossings;
   time intervals between the edge crossings; and
   path of the pointing device.

43. The method of claim 42, further comprising authenticating the user input by performing a combination of comparisons, the combination of comparisons comprising at least two selected from the group consisting of:
   comparing directions for the edge crossings with previously stored edge crossing directions;
   comparing time intervals between the edge crossings with previously stored time intervals between edge crossings; and
   comparing path of the pointing device with a previously stored path.

44. The method of claim 42, further comprising authenticating the user input by performing a combination of comparisons, the combination of comparisons comprising comparing the generated symbolic representation with a previously stored symbolic representation, the combination of comparisons further comprising at least two selected from the group consisting of:
   comparing directions for the edge crossings with previously stored edge crossing directions;
   comparing time intervals between the edge crossings with previously stored time intervals between edge crossings; and
   comparing path of the pointing device with a previously stored path.

45. The method of claim 38, further comprising authenticating the user input by performing a combination of comparisons, the combination of comparisons comprising at least two selected from the group consisting of:
   comparing directions for the edge crossings with previously stored edge crossing directions;
   statistical comparison of time intervals between the edge crossings with previously stored time intervals between edge crossings; and
   statistical comparison of path of the pointing device with a previously stored path.

46. The method of claim 1, wherein generating a symbolic sequence from the detected edge crossings comprises:
   a) comparing an edge sequence of detected edge crossings with entries in a lookup table;
   b) identifying a longest matching entry in the lookup table;
   c) appending the identified entry to a result string; and
   d) responsive to the edge sequence containing data that has not been matched to an entry in the lookup table, repeating steps b) through d) for the data that has not been matched.

47. A computer program product for data entry and authentication comprising a non-transitory computer-readable medium having computer program code for:
   receiving user input representing a pattern drawn over one or more of a plurality of edges;
   detecting edge crossings within the pattern, one of the detected edge crossings specifying an identified point;
   mapping the plurality of edges to a plurality of symbolic representations, each edge having a unique symbolic representation that includes at least one character, with a relative mapping using the identified point as an origin for the relative mapping; and
   generating a symbolic sequence from the detected edge crossings, using based on the mappings between the edges and the symbolic representations.

48. The computer program product of claim 47, wherein the symbolic sequence comprises a representation of a series of detected edge crossings.

49. The computer program product of claim 47, wherein the symbolic sequence comprises a representation of a series of detected edge crossings and of the direction of each edge crossing.

50. The computer program product of claim 47, wherein the user input comprises a signature.

51. The computer program product of claim 47, wherein the received user input comprises pen-based input.

52. The computer program product of claim 47, wherein the computer program code for receiving user input comprises computer program code for detecting pen-based input on an input pad.

53. The computer program product of claim 47, further comprising computer program code for providing user feedback by, responsive to the received user input, highlighting crossed edges.

54. The computer program product of claim 47, wherein the computer program code for receiving user input comprises computer program code for detecting input on a touch-sensitive pad.

55. The computer program product of claim 47, further comprising computer program code for outputting the generated symbolic sequence.

56. The computer program product of claim 47, further comprising computer program code for authenticating the generated symbolic sequence.

57. The computer program product of claim 47, wherein the pattern represents a user signature.

58. The computer program product of claim 47, further comprising computer program code for detecting directions for the edge crossings.

59. The computer program product of claim 47, further comprising computer program code for detecting time intervals between the edge crossings.

60. The computer program product of claim 47, wherein the computer program code for receiving user input comprises computer program code for receiving user input via a pointing device, the computer program product further comprising computer program code for detecting a path of the pointing device.

61. The computer program product of claim 47, wherein the computer program code for receiving user input comprises computer program code for receiving user input via a pointing device, the computer program product further comprising computer program code for detecting at least two selected from the group consisting of:
   directions for the edge crossings;
   time intervals between the edge crossings; and
   path of the pointing device.

62. A data entry and authentication system, comprising:
   an input device, for receiving user input representing a pattern drawn over one or more of a plurality of edges;
   a mapping system for mapping the plurality of edges to a plurality of symbolic representations, each edge having a unique symbolic representation that includes at least one character; and
   a processor, coupled to the input device and the mapping system, for detecting edge crossings within the pattern, one of the detected edge crossings specifying an identified point, and generating a symbolic sequence from the detected edge crossings based on the mappings between the edges and the symbolic representations, the mapping system further configured to map the plurality of edges to the plurality of symbolic representations with a relative mapping using the identified point as an origin for the relative mapping.

63. The system of claim 62, wherein the symbolic sequence comprises a representation of a series of detected edge crossings.

64. The system of claim 62, wherein the symbolic sequence comprises a representation of a series of detected edge crossings and of the direction of each edge crossing.

65. The system of claim 62, wherein the user input comprises a signature.

66. The system of claim 62, wherein the received user input comprises pen-based input.

67. The system of claim 62, further comprising an output device, coupled to the processor, for displaying the plurality of edges.

68. The system of claim 67, wherein the input device and the output device comprise a combined input/output device.

69. The system of claim 62, wherein the input device comprises an input pad for detecting pen-based input.

70. The system of claim 62, further comprising an output device, coupled to the processor, for providing user feedback by, responsive to the received user input, highlighting crossed edges.

71. The system of claim 62, wherein the input device comprises a touch-sensitive pad for receiving user input.

72. The system of claim 62, further comprising an output device, coupled to the processor, for outputting the generated symbolic sequence.

73. The system of claim 62, wherein the processor authenticates the generated symbolic sequence.

74. The system of claim 73, wherein the processor authenticates the generated symbolic sequence by comparing the generated symbolic sequence with a previously stored symbolic sequence.

75. The system of claim 62, wherein the symbolic sequence comprises a string of alphanumeric characters.

76. The system of claim 75, wherein the input device receives user input modifying the string, the system further comprising:

a storage device, coupled to the processor, for storing the modified user string.

77. The system of claim 76, wherein the storage device associates the modified user string with a representation of the pattern.

78. The system of claim 62, wherein the plurality of edges forms a grid.

79. The system of claim 78, wherein the mappings between the edges and the symbolic representations are based on the positions of the edges within the grid.

80. The system of claim 62, wherein the plurality of edges forms a grid of squares.

81. The system of claim 62, wherein the plurality of edges forms a grid of rectangles.

82. The system of claim 62, wherein the pattern comprises a series of lines.

83. The system of claim 62, wherein the pattern represents a user signature.

84. The system of claim 62, wherein the pattern represents at least one alphanumeric character.

85. The system of claim 62, wherein the input device detects user input indicating completion of the pattern, and wherein the processor generates a symbolic sequence is performed responsive to the input device detecting the user input indicating completion of the pattern.

86. The system of claim 62, further comprising a storage device, coupled to the processor, for storing the generated symbolic sequence.

87. The system of claim 62, wherein the processor detects directions for the edge crossings.

88. The system of claim 87, wherein the processor authenticates the user input by comparing the detected edge crossing directions with previously stored edge crossing directions.

89. The system of claim 87, wherein the processor authenticates the user input by comparing the generated symbolic representation with a previously stored symbolic representation and by comparing the detected edge crossing directions with previously stored edge crossing directions.

90. The system of claim 62, wherein the processor detects time intervals between the edge crossings.

91. The system of claim 90, wherein the processor authenticates the user input by comparing the detected time intervals with previously stored time intervals.

92. The system of claim 90, wherein the processor authenticates the user input by comparing the generated symbolic representation with a previously stored symbolic representation and by comparing the detected time intervals with previously stored time intervals.

93. The system of claim 90, wherein the processor authenticates the user input by performing statistical comparison of the detected time intervals with previously stored time intervals.

94. The system of claim 62, wherein the input device comprises a pointing device, and wherein the processor detects at least two selected from the group consisting of:

directions for the edge crossings;
time intervals between the edge crossings; and
path of the pointing device.

95. The system of claim 94, wherein the processor authenticates the user input by performing a combination of comparisons, the combination of comparisons comprising at least two selected from the group consisting of:

comparing directions for the edge crossings with previously stored edge crossing directions;
comparing time intervals between the edge crossings with previously stored time intervals between edge crossings; and
comparing path of the pointing device with a previously stored path.

96. The system of claim 94, wherein the processor authenticates the user input by performing a combination of comparisons, the combination of comparisons comprising comparing the generated symbolic representation with a previously stored symbolic representation, the combination of comparisons further comprising at least two selected from the group consisting of:

comparing directions for the edge crossings with previously stored edge crossing directions;
comparing time intervals between the edge crossings with previously stored time intervals between edge crossings; and
comparing path of the pointing device with a previously stored path.

97. The system of claim 90, wherein the processor authenticates the user input by performing a combination of comparisons, the combination of comparisons comprising at least two selected from the group consisting of:

comparing directions for the edge crossings with previously stored edge crossing directions;

statistical comparison of time intervals between the edge crossings with previously stored time intervals between edge crossings; and statistical comparison of path of the pointing device with a previously stored path.

98. The system of claim 62, wherein the processor generates a symbolic sequence from the detected edge crossings by:

a) comparing an edge sequence of detected edge crossings with entries in a lookup table;

b) identifying a longest matching entry in the lookup table;

c) appending the identified entry to a result string; and d) responsive to the edge sequence containing data that has not been matched to an entry in the lookup table, repeating steps b) through d) for the data that has not been matched.

* * * * *